US012628117B2

(12) United States Patent
Hidaka

(10) Patent No.: US 12,628,117 B2
(45) Date of Patent: May 12, 2026

(54) POSITION DETERMINATION TIMING SELECTION DEVICE, WIRELESS COMMUNICATION SYSTEM, POSITION DETERMINATION TIMING SELECTION METHOD, AND RECORDING MEDIUM

(71) Applicant: NEC Corporation, Tokyo (JP)

(72) Inventor: Takeo Hidaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 296 days.

(21) Appl. No.: 18/281,800

(22) PCT Filed: Jan. 25, 2022

(86) PCT No.: PCT/JP2022/002590
§ 371 (c)(1),
(2) Date: Sep. 13, 2023

(87) PCT Pub. No.: WO2022/196110
PCT Pub. Date: Sep. 22, 2022

(65) Prior Publication Data
US 2024/0163839 A1 May 16, 2024

(30) Foreign Application Priority Data
Mar. 16, 2021 (JP) ................................. 2021-042605

(51) Int. Cl.
*H04W 64/00* (2009.01)
*H04W 72/0446* (2023.01)
*H04W 72/51* (2023.01)

(52) U.S. Cl.
CPC ..... *H04W 64/006* (2013.01); *H04W 72/0446* (2013.01); *H04W 72/51* (2023.01)

(58) Field of Classification Search
CPC ... H04W 64/00; H04W 64/006; H04W 24/10; H04W 4/02; H04W 4/38; H04W 72/0446; H04W 72/51; Y02D 30/70
See application file for complete search history.

(56) References Cited

U.S. PATENT DOCUMENTS

| | | | | |
|---|---|---|---|---|
| 5,945,948 A | * | 8/1999 | Buford | H04W 64/00 342/457 |
| 10,353,048 B2 | * | 7/2019 | Oh | G01S 5/14 |
| 2007/0222679 A1 | * | 9/2007 | Morris | G01S 13/878 342/442 |

FOREIGN PATENT DOCUMENTS

| | | |
|---|---|---|
| JP | 2006-112816 A | 4/2006 |
| JP | 2006-245930 A | 9/2006 |

(Continued)

OTHER PUBLICATIONS

International Search Report for PCT Application No. PCT/JP2022/002590, mailed on May 10, 2022.

*Primary Examiner* — Siu M Lee
(74) *Attorney, Agent, or Firm* — Sughrue Mion, PLLC

(57) ABSTRACT

Channel identification information indicating a channel measured by each of a plurality of measurement devices that measure a radio wave strength of radio waves propagating in the channel used by a wireless terminal device for radio wave transmission, and information indicating a measurement time at which the measurement was performed are acquired. For each channel, a time at which number of the measurement devices performing measurement satisfies a predetermined condition defined in advance is selected based on the acquired channel identification information of each measurement device and the information indicating the measurement time. A position determination time for each channel from each selected time is selected, and the channel identification information indicating the channel used by the (Continued)

wireless terminal device subject to position determination is acquired.

11 Claims, 9 Drawing Sheets

(56) References Cited

FOREIGN PATENT DOCUMENTS

| | | | |
|---|---|---|---|
| JP | 2007-053483 | A | 3/2007 |
| JP | 2008-236516 | A | 10/2008 |

* cited by examiner

FIG. 2

SERVER DEVICE — 9

STORAGE UNIT — 92

TRANSMISSION AND RECEPTION UNIT — 91

TO INTERNET NETWORK

FIG. 3

TERMINAL DEVICE DATA TABLE — 93

| TERMINAL DEVICE IDEN-TIFICATION INFORMATION | CHANNEL IDENTIFI-CATION INFORMATION |
|---|---|
| A | 1 |
| B | 6 |
| ⋮ | ⋮ |

FIG. 4

MEASUREMENT DEVICE DATA TABLE — 94

| MEASUREMENT DEVICE IDEN-TIFICATION INFORMATION | CHANNEL IDENTIFI-CATION INFORMATION | MEASUREMENT PERIOD |
|---|---|---|
| α | 1 | EVERY 100 SEC. |
| | 6 | EVERY 100 SEC. |
| β | 1 | EVERY 100 SEC. |
| | 6 | EVERY 100 SEC. |
| ⋮ | ⋮ | ⋮ |

FIG. 5

MEASUREMENT DATA TABLE ~95

| MEASUREMENT DEVICE IDEN-TIFICATION INFORMATION | CHANNEL IDENTIFI-CATION INFORMATION | MEASUREMENT START TIME | MEASUREMENT END TIME | TERMINAL DEVICE IDEN-TIFICATION INFORMATION | RADIO WAVE STRENGTH |
|---|---|---|---|---|---|
| α | 1 | 10:10:00 | 10:10:25 | A | 50 |
| β | 6 | 10:15:00 | 10:15:25 | B | 60 |
| ... | ... | ... | ... | ... | ... |

FIG. 7

POSITION DETERMINATION TIMING TABLE — 155

| TERMINAL DEVICE IDENTIFICATION INFORMATION | ADDRESS INFORMATION | CHANNEL IDENTIFICATION INFORMATION | RESPONSE REQUEST SIGNAL TRANSMISSION TIME | | |
|---|---|---|---|---|---|
| | | | TRANSMISSION TIME 1 | TRANSMISSION TIME 2 | ... |
| A | IP-A | 1 | 0:00:00 | 0:00:50 | ... |
| B | IP-B | 6 | 0:00:10 | 0:01:00 | ... |
| ... | ... | ... | ... | ... | ... |

POSITION DETERMINATION TIMING SELECTION DEVICE, WIRELESS COMMUNICATION SYSTEM, POSITION DETERMINATION TIMING SELECTION METHOD, AND RECORDING MEDIUM

This application is a National Stage Entry of PCT/JP2022/002590 filed on Jan. 25, 2022, which claims priority from Japanese Patent Application 2021-042605 filed on Mar. 16, 2021, the contents of all of which are incorporated herein by reference, in their entirety.

TECHNICAL FIELD

The present invention relates to a position determination timing selection device, a wireless communication system, a position determination timing selection method, and a recording medium.

BACKGROUND ART

There is a service that locates the position of a wireless terminal device, such as a smartphone owned by the user, based on the radio wave strength of the wireless terminal device. To measure radio wave strength, a wireless terminal device must emit radio waves into the air. The following two methods exist for radiating radio waves. One method is triggered by the wireless terminal device side. In this method, for example, an application program for positioning is installed in a wireless terminal device, and when the application program runs, the wireless terminal device radiates radio waves for positioning. The other method is triggered by the network side. In this method, an external terminal device that connects to the wireless terminal device via the communication network sends a response request packet to the wireless terminal device at the timing for positioning. When the wireless terminal device receives the response request packet, it sends a response packet and radiates radio waves when sending the response packet. This radio wave is the radio wave for positioning.

A common issue with these methods is that if the wireless terminal device emits excessive radio waves for positioning, the battery of the wireless terminal device is drained significantly, while if the intervals between radio wave emissions are thinned out, the frequency and accuracy of positioning updates will be reduced. In view of these issues, there are technologies to reduce battery drain of wireless terminal devices, as disclosed in, for example, Patent Documents 1 and 2.

PRIOR ART DOCUMENTS

Patent Documents

Patent Document 1: Japanese Unexamined Patent Application, First Publication No. 2006-245930
Patent Document 2: Japanese Unexamined Patent Application, First Publication No. 2007-053483

SUMMARY OF THE INVENTION

Problems to be Solved by the Invention

The invention described in Patent Document 1 was made for the purpose of enabling location search operation for a longer period of time with a simple operation by making it low power and improving user convenience in a communication terminal with an added location search function. In the invention described in Patent Document 1, after the power supply is turned off, the location information acquired by the location information acquisition means is transmitted to another terminal or monitoring device via a network by a communication means, thereby reducing power consumption.

However, the invention described in Patent Document 1 aims to achieve low power consumption by performing positioning triggered by the power-off operation by the power key. Therefore, it is necessary to add a new function to the wireless terminal device, for example, installing an application program to perform positioning triggered by the power-off operation using the power key.

The invention described in Patent Document 2 is an invention made for the purpose of providing a method for obtaining location information for a wireless terminal device set to power-saving mode. The invention described in Patent Document 2 does not use the wireless terminal device side as the trigger for positioning as in Patent Document 1, but instead uses the network side as the trigger for positioning. In the invention described in Patent Document 2, an access point (hereinbelow referred to as an AP) transmits a beacon frame containing stored data information to the effect that there is stored data, regardless of whether there is stored data addressed to the wireless terminal device that has entered the power-saving mode. The wireless terminal device that has transitioned to the power-saving mode and entered the Dawes state transitions to the awake state before receiving the beacon frame and refers to the received beacon frame. The beacon frame referred to by the wireless terminal device contains stored data information that indicates the presence of stored data regardless of the presence or absence of the stored data. Therefore, the wireless terminal device judges that there is stored data and sends a stored data request frame to the AP. At that time, since the wireless terminal device radiates radio waves, positioning can be performed based on those radio waves. If the stored data does not actually exist, the AP sends dummy data to the wireless terminal device, and the wireless terminal device that receives the dummy data transitions back to power-saving mode. This enables positioning of the wireless terminal device while achieving power efficiency in the device.

However, the invention described in Patent Document 2 requires a special AP that transmits beacon frames containing stored data information indicating the presence of stored data regardless of the presence or absence of stored data. In addition, when the transmission interval of beacon frames is short, the wireless terminal device radiates excessive radio waves, which causes significant battery drain in the wireless terminal device.

An example object of the present invention is to provide a position determination timing selection device, a wireless communication system, a position determination timing selection method, and a recording medium that solve the above-mentioned problems.

Means for Solving the Problem

According to the first example aspect of the present invention, a position determination timing selection device includes: a measurement data acquisition means that acquires channel identification information indicating a channel measured by each of a plurality of measurement devices that measure a radio wave strength of radio waves propagating in the channel used by a wireless terminal device for radio wave transmission, and information indicating a measurement time at which the measurement was performed; a position determination timing selection means that, for each channel, selects a time at which number of the measurement devices performing measurement satisfies a predetermined condition defined in advance based on the channel identification information of each measurement device acquired by the measurement data acquisition means and the information indicating the measurement time, and selects a position determination time for each channel from each selected time; a terminal device data acquisition means that acquires the channel identification information indicating the channel used by the wireless terminal device subject to position determination; and a position determination start instruction means that transmits a response request signal addressed to the wireless terminal device subject to the position determination at the position determination time selected by the position determination timing selection means for the channel of the channel identification information acquired by the terminal device data acquisition means.

According to the second example aspect of the present invention, a wireless communication system includes: a wireless terminal device; a plurality of measurement devices that measure a radio wave strength of radio waves propagating in a channel used by the wireless terminal device for radio wave transmission; and a position determination timing selection device, and the position determination timing selection device includes: a measurement data acquisition means that acquires channel identification information indicating the channel measured by each of the plurality of measurement devices, and information indicating a measurement time at which the measurement was performed; a position determination timing selection means that, for each channel, selects a time at which number of the measurement devices performing measurement satisfies a predetermined condition defined in advance based on the channel identification information of each measurement device acquired by the measurement data acquisition means and the information indicating the measurement time, and selects a position determination time for each channel from each selected time; a terminal device data acquisition means that acquires the channel identification information indicating the channel used by the wireless terminal device subject to position determination; and a position determination start instruction means that transmits a response request signal addressed to the wireless terminal device subject to the position determination at the position determination time selected by the position determination timing selection means for the channel of the channel identification information acquired by the terminal device data acquisition means.

According to the third example aspect of the present invention, a position determination timing selection method includes: acquiring channel identification information indicating a channel measured by each of a plurality of measurement devices that measure a radio wave strength of radio waves propagating in the channel used by a wireless terminal device for radio wave transmission, and information indicating a measurement time at which the measurement was performed; selecting, for each channel, a time at which number of the measurement devices performing measurement satisfies a predetermined condition defined in advance based on the acquired channel identification information of each measurement device and the information indicating the measurement time; selecting a position determination time for each channel from each selected time; acquiring the channel identification information indicating the channel used by the wireless terminal device subject to position determination; and transmitting a response request signal addressed to the wireless terminal device subject to the position determination at the selected position determination time for the channel of the acquired channel identification information.

According to the fourth example aspect of the present invention, a recording medium stores a program for causing a computer to function as: a measurement data acquisition means that acquires channel identification information indicating a channel measured by each of a plurality of measurement devices that measure a radio wave strength of radio waves propagating in the channel used by a wireless terminal device for radio wave transmission, and information indicating a measurement time at which the measurement was performed; a position determination timing selection means that, for each channel, selects a time at which number of the measurement devices performing measurement satisfies a predetermined condition defined in advance based on the channel identification information of each measurement device acquired by the measurement data acquisition means and the information indicating the measurement time, and selects a position determination time for each channel from each selected time; a terminal device data acquisition means that acquires the channel identification information indicating the channel used by the wireless terminal device subject to position determination; and a position determination start instruction means that transmits a response request signal addressed to the wireless terminal device subject to the position determination at the position determination time selected by the position determination timing selection means for the channel of the channel identification information acquired by the terminal device data acquisition means.

Effect of Invention

According to an example embodiment of the present invention, it is possible to perform position determination while reducing the drain on the battery of the wireless terminal device without adding new functions for position determination to the wireless terminal device and an access point.

BRIEF DESCRIPTION OF THE DRAWINGS

FIG. 2 is a block diagram showing the internal configuration of the server device according to the example embodiment of the present invention.

FIG. 3 is a diagram showing the data structure of the terminal device data table according to the example embodiment of the present invention.

FIG. 4 is a drawing showing the data structure of the terminal device data table according to the example embodiment of the present invention.

FIG. 5 is a drawing showing the data structure of the measurement data table according to the example embodiment of the present invention.

FIG. 7 is a drawing showing the data structure of the position determination timing table stored by the position determination timing table storage unit according to the example embodiment of the present invention.

EXAMPLE EMBODIMENT

Figure 1:
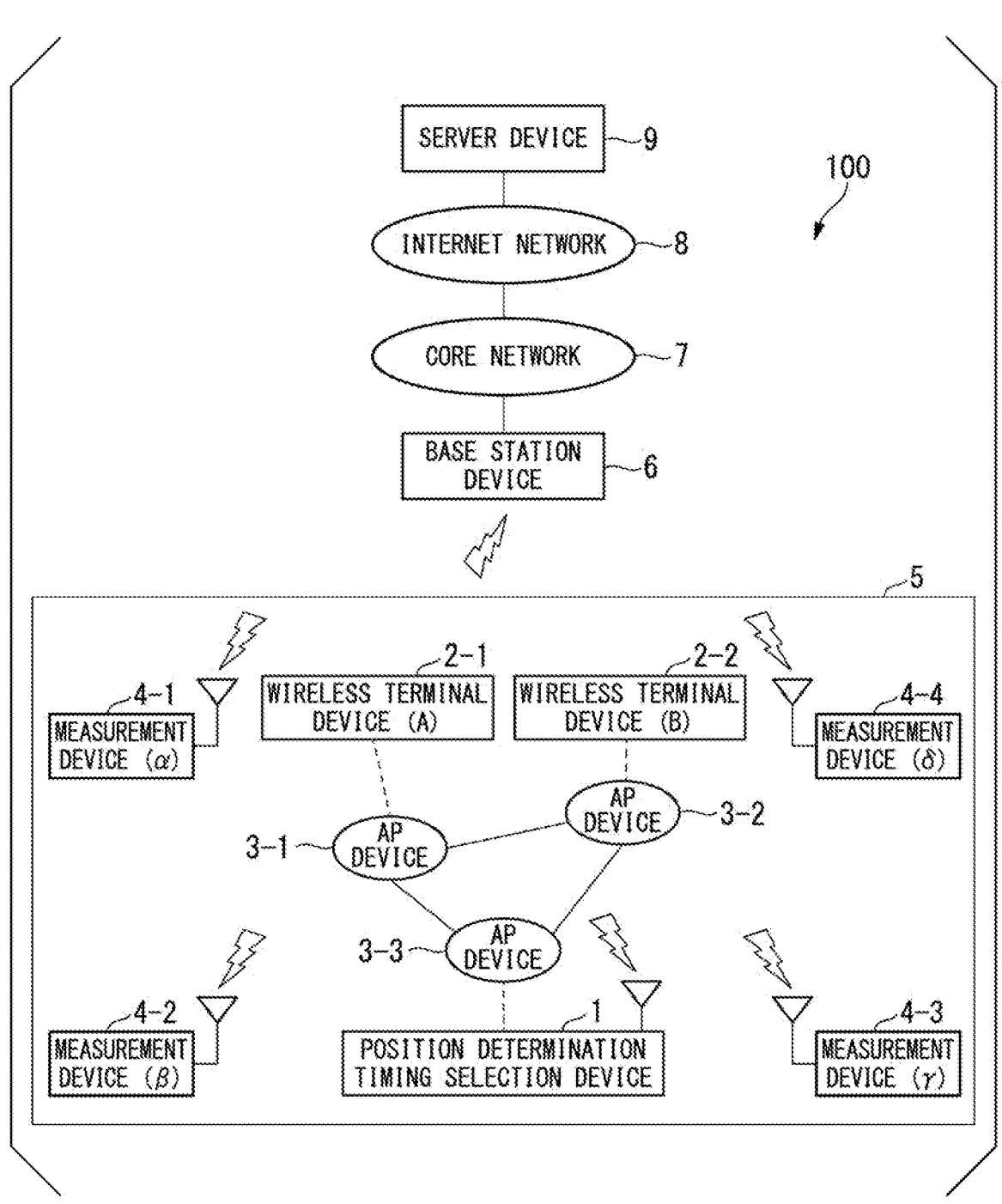
FIG. 1 is a block diagram showing the configuration of the wireless communication system according to the example embodiment of the present invention.

A wireless communication system 100 according to the example embodiment of the present invention will be described below with reference to the drawings. FIG. 1 is a block diagram showing the configuration of the wireless communication system 100. The wireless communication system 100 includes a position determination timing selection device 1, wireless terminal devices 2-1, 2-2, AP devices 3-1, 3-2, 3-3, measurement devices 4-1, 4-2, 4-3, 4-4, base station devices 6, a core network 7, an Internet network 8, and a server device 9.

The base station device 6 is, for example, a device installed at the base station side in an LTE (registered trademark) (Long Term Evolution) mobile communication network operated by a telecommunications carrier. The core network 7 is a communication network operated by the aforementioned telecommunications carrier and connects base station device 6 to the Internet network 8. The Internet network 8 is a communication network constructed by multiple telecommunication providers such as ISPs (Internet Service Providers). The server device 9 is, for example, a cloud server, which is connected to the Internet network 8 and performs processes such as storing data in its internal storage area.

FIG. 2 is a block diagram showing the internal structure of the server device 9. The server device 9 includes a transmission and reception unit 91 and a storage unit 92. The transmission and reception unit 91 is, for example, a communication module that communicates using the Internet Protocol (IP), connects to the Internet network 8, and transmits/receives data to/from devices connected via the Internet network 8. The storage unit 92 is, for example, a hard disk drive (HDD), which stores the tables shown in FIGS. 3 to 5.

FIG. 3 is a diagram showing the data structure of the terminal device data table 93. The terminal device data table 93 has the fields "terminal device identification information" and "channel identification information". In the "terminal device identification information" field, terminal device identification information that can identify each of the wireless terminal device 2-1 and 2-2 is written. The terminal device identification information is, for example, the MAC (Media Access Control) address assigned in advance to each of the wireless terminal devices 2-1 and 2-2. In the "channel identification information" field, channel identification information identifying the channel used by the wireless terminal device 2-1, 2-2 identified by the terminal device identification information written in the corresponding "terminal device identification information" field, for example, in a wireless LAN (Local Area Network), is written. The channel identification information is, for example, a number.

The writing of terminal device data to the terminal device data table 93 is done, for example, as follows. Each of the wireless terminal devices 2-1, 2-2 acquires channel identification information indicating the channel when connected to one of the AP devices 3-1, 3-2, 3-3, and generates a terminal device data write request signal containing the acquired channel identification information and its own terminal device identification information. Each of the wireless terminal devices 2-1, 2-2 transmits the generated terminal device data write request signal via the connected AP devices 3-1, 3-2, 3-3 and the Internet network 8 to the transmission and reception unit 91 of the server device 9. When the transmission and reception unit 91, upon receiving the terminal device data write request signal, writes the terminal device identification information and channel identification information included in the received terminal device data write request signal to the terminal device data table 93 of the storage unit 92. If a record of the terminal device identification information to be written already exists in the terminal device data table 93, the transmission and reception unit 91 overwrites the channel identification information contained in the terminal device data write request signal for the "channel identification information" field of that record. In contrast, if there is no record of the terminal device identification information to be written in the terminal device data table 93, the transmission and reception unit 91 generates a new record and writes the terminal device identification information and the channel identification information in the generated record. Each of the wireless terminal devices 2-1 and 2-2 generates a terminal device data write request signal and transmits it to the transmission and reception unit 91 of the server device 9 when the connection channel is switched.

FIG. 4 shows the data structure of the measurement device data table 94. The measurement device data table 94 has the fields "measurement device identification information," "channel identification information," and "measurement period". In the "measurement device identification information" field, measurement device identification information that can identify each of the measurement devices 4-1 to 4-4 is written. The measurement device identification information is assigned in advance to each of the measurement devices 4-1 to 4-4 so that each is a different pieces of identification information, and is represented, for example, by a symbol or number.

In the "channel identification information" field is written the channel identification information corresponding to the channels measured by the measurement devices 4-1 to 4-4 identified by the measurement device identification information written in the corresponding "measurement device identification information" field. FIG. 4 shows that one measurement device 4-1 to 4-4 measures two pieces of channel identification information "1" and "6", but one measurement device 4-1 to 4-4 may measure one channel, and may measure three or more channels.

In the "measurement period" field is written the time (measurement period) indicating the interval for measuring the channel indicated by the channel identification information written in the corresponding "channel identification information" field. The example shown in FIG. 4 shows an example where all of the measurement periods are "every 100 seconds". However, the measurement period may be different for each channel. The measurement period may be different for each of the measurement devices 4-1 to 4-4 when each of the measurement devices 4-1 to 4-4 measures the same channel.

Writing measurement device data to the measurement device data table 94 is performed, for example, as follows. Prior to the start of operation, the measurement devices 4-1 to 4-4 have their measurement device identification information, channel identification information indicating the channel to be measured, and the measurement period for each channel written into their internal memory area by an operation of the operator. Upon being activated, the measurement devices 4-1 to 4-4 generate a measurement device data write request signal that includes the measurement device identification information, channel identification information, and measurement period, which are stored by the internal memory area. The measurement devices 4-1 to 4-4 each send the generated measurement device data write request signal to the transmission and reception unit 91 of the server device 9 via the base station device 6, the core network 7, and the Internet network 8. The transmission and reception unit 91, upon receiving the measurement device data write request signal, writes the measurement device identification information, channel identification information, and measurement period included in the received measurement device data write request signal into the measurement device data table 94 in the storage unit 92. If a record of the measurement identification information to be written already exists in the measurement device data table 94, the transmission and reception unit 91 overwrites the channel identification information and the measurement period included in the measurement device data write request signal to the "channel identification information" and "measurement period" fields in that record. In contrast, if there is no record of the measurement identification information to be written in the measurement device data table 94, the transmission and reception unit 91 generates a new record and writes the measurement device identification information, channel identification information, and measurement period in the generated record. The measurement devices 4-1 to 4-4 also generate a measurement device data write request signal and send it to the transmission and reception unit 91 of the server device 9 when the channel identification information and measurement period in the internal storage area are rewritten by an operation of the operator after operation starts.

FIG. 5 shows the data structure of the measurement data table 95. The measurement data table 95 has the following items: "measurement device identification information," "channel identification information," "measurement start time," "measurement end time," "terminal device identification information," and "radio wave strength". In the "measurement device identification information" field is written the measurement device identification information corresponding to one of the measurement devices 4-1 to 4-4. In the fields "channel identification information," "measurement start time," "measurement end time," "terminal device identification information," and "radio wave strength" are respectively written the channel identification information indicating the channel measured by the measurement device 4-1 to 4-4 whose measurement device identification information is written in the corresponding "measurement device identification information", the time at which measurement was started, the time measurement ended, the terminal device identification information of the wireless terminal device 2-1, 2-2 to be measured, and the radio wave strength of the measured radio wave.

Writing the measurement data to the measurement data table 95 is performed, for example, as follows. Each of the measurement devices 4-1 to 4-4 is equipped with an internal clock unit, such as a clock, and acquires the time from the clock unit when starting and finishing measurement. When the measurement is completed, each of the measurement devices 4-1 to 4-4 generates a measurement data write request signal that includes the measurement device identification information of the own device, the channel identification information of the measured channel, the measurement start time, the measurement end time, the terminal device identification information of the wireless terminal devices 2-1 and 2-2 that were measured, and the measured radio wave strength. The measurement devices 4-1 to 4-4 transmit the generated measurement data write request signals to the transmission and reception unit 91 of the server device 9 via the base station device 6, core network 7 and Internet network 8. The transmission and reception unit 91, upon receiving the measurement data write request signal, generates a new record in the measurement data table 95 in the storage unit 92. The transmission and reception unit 91 writes the measurement device identification information, channel identification information, measurement start time, measurement end time, terminal device identification information, and radio wave strength included in the received measurement data write request signal in the generated record. In other words, one new record is added to the measurement data table 95 every time the measurement device 4-1 to 4-2 performs a measurement.

Returning to FIG. 1, the position determination timing selection device 1, wireless terminal devices 2-1, 2-2, AP devices 3-1, 3-2, 3-3, and measurement devices 4-1, 4-2, 4-3, 4-4 are installed on one floor 5 in a building, for example. The AP devices 3-1 to 3-3 are devices such as wireless LAN routers, which are connected to an ISP's communication network (not shown) and connect to the Internet network 8 via that ISP's communication network. The AP devices 3-1 to 3-3 provide multiple wireless LAN channels and connect to the wireless terminal devices 2-1, 2-2 and the position determination timing selection device 1 via the provided channels.

The wireless terminal devices 2-1 and 2-2 are terminal devices whose positions are to be determined, e.g., smartphones and other devices equipped with wireless LAN communication functions. The wireless terminal devices 2-1 and 2-2 are assigned terminal identification information in advance as described above. The wireless terminal devices 2-1 and 2-2 use one of the wireless LAN channels provided by the AP devices 3-1 to 3-3 to connect to any one of the AP devices 3-1 to 3-3. In the following explanation, each of the wireless terminal devices 2-1 and 2-2 may be shown as having "A" and "B" pre-assigned thereto as terminal device identification information, respectively.

The measurement devices 4-1 to 4-4 are, for example, wireless sensors. The measurement devices 4-1 to 4-4, upon being activated, measure the radio wave strength of radio waves propagating in the channel indicated by the channel identification information written in advance in the internal memory area for a certain period of time at each measurement period written in advance in the internal memory area. Each of the measurement devices 4-1 to 4-4 starts measuring upon being activated, and therefore, the measurement is performed asynchronously. The measurement devices 4-1 to 4-4 are devices equipped with terminal station-side communication functions of the LTE (registered trademark) protocol, connect to base station device 6, and transmit and receive data to and from base station device 6. The measurement devices 4-1 to 4-4 are assigned measurement device identification information as described above, with the channel identification information indicating the channel to be measured and the measurement period associated with the channel identification information being set in advance. In the following explanation, each of the measurement devices 4-1 to 4-4 may be shown as having "α", "β", "γ", and "δ" assigned to it in advance as measurement device identification information, respectively.

The example in FIG. 1 shows two wireless terminal devices 2-1, 2-2 and three AP devices 3-1 to 3-3. However, the number of wireless terminal devices 2-1 and 2-2 to be installed and the number of AP devices 3-1 to 3-3 to be installed are not particularly limited. The number of each of wireless terminal devices 2-1, 2-2 and AP devices 3-1 to 3-3 may be any number greater than or equal to one. The example in FIG. 1 also shows four measurement devices 4-1 to 4-4. However, the number of measurement devices 4-1 to 4-4 to be installed may be any number of 2 or more.

Figure 6:
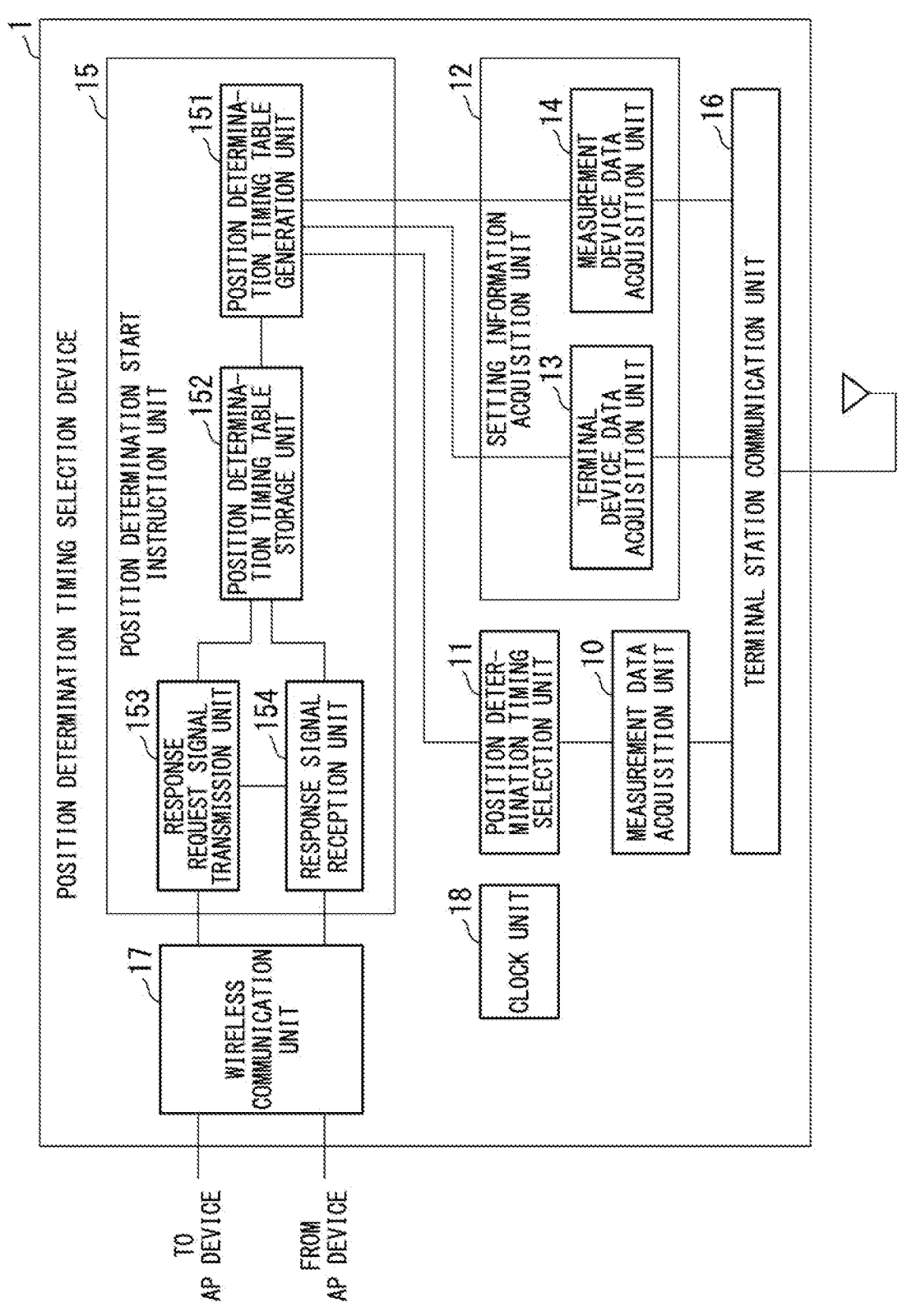
FIG. 6 is a block diagram showing the internal structure of the position determination timing selection device according to the example embodiment of the present invention.

The position determination timing selection device 1, for example, has the internal configuration shown in FIG. 6. In other words, the position determination timing selection device 1 includes a measurement data acquisition unit 10, a position determination timing selection unit 11, a setting information acquisition unit 12, a position determination start instruction unit 15, a terminal station communication unit 16, a wireless communication unit 17, and a clock unit 18. The terminal station communication unit 16 is a functional unit with a LTE (registered trademark) terminal station communication function and connects to the base station device 6. The wireless communication unit 17 is a functional unit with a wireless LAN communication function, and connects to any one of the AP devices 3-1 to 3-3 using any one of the wireless LAN channels provided by the AP devices 3-1 to 3-3. The wireless communication unit 17 and the wireless terminal devices 2-1 and 2-2 are assumed to belong to the same wireless LAN subnet. The clock unit 18 is, for example, a clock. The clock unit that each of the measurement devices 4-1 to 4-4 has internally and the clock unit 18 are pre-set to synchronize their times.

The measurement data acquisition unit 10 periodically generates a measurement data request signal that requests acquisition of measurement data of a time width indicated by an arbitrarily determined acquisition start point time and acquisition end point time. The measurement data acquisition unit 10 transmits the generated measurement data request signal to the server device 9. The measurement data acquisition unit 10 receives a measurement data transmission signal sent by the server device 9 in response to reception of the measurement data request signal. The measurement data transmission signal received by the measurement data acquisition unit includes the measurement data between the acquisition start point time and the acquisition end point time read from the measurement data table 95 by the transmission and reception unit 91 of the server device 9.

In order to suppress the total amount of radio waves emitted by the wireless terminal devices 2-1 and 2-2, the position determination timing selection unit 11 selects, for each measurement period, a time slot that maximizes the number of measurement devices 4-1 to 4-4 that perform measurement for each channel, based on the measurement data acquired by the measurement data acquisition unit 10. The position determination timing selection unit 11 selects each of the selected time slots as the position determination time per measurement period for each of the channels. Here, a time slot is a time interval of a certain length of time. A measurement period indicates each segment of time having a certain time length including a plurality of continuous time slots.

The setting information acquisition unit 12 includes a terminal device data acquisition unit 13 and a measurement device data acquisition unit 14. The terminal device data acquisition unit 13 generates a terminal device data request signal and transmits the generated terminal device data request signal to the server device 9. The terminal device data acquisition unit 13 receives the terminal device data transmission signal sent by the server device 9 in response to reception of the terminal device data request signal. The terminal device data transmission signal contains terminal device data read by the transmission and reception unit 91 of the server device 9 from the terminal device data table 93.

The measurement device data acquisition unit 14 generates a measurement device data request signal and transmits the generated measurement device data request signal to the server device 9. The measurement device data acquisition unit 14 receives the measurement device data transmission signal sent by the server device 9 in response to reception of the measurement device data request signal. The measurement device data transmission signal contains measurement device data that is read by the transmission and reception unit 91 of the server device 9 from the measurement device data table 94.

The position determination start instruction unit 15 includes a position determination timing table generation unit 151, a position determination timing table storage unit 152, a response request signal transmission unit 153, and a response signal reception unit 154. The position determination timing table generation unit 151 generates a position determination timing table 155 in the position determination timing table storage unit 152 based on the terminal device data acquired by the terminal device data acquisition unit 13 and the measurement device data acquired by the measurement device data acquisition unit 14. The position determination timing table generation unit 151 updates the position determination timing table 155 based on the position determination time selected by the position determination timing selection unit 11 in each measurement period for each channel. The position determination timing table storage unit 152 stores the position determination timing table 155 generated by the position determination timing table generation unit 151.

FIG. 7 shows the data structure of the position determination timing table 155. The position determination timing table 155 has the fields "terminal device identification information," "address information," "channel identification information," and "response request signal transmission time". The terminal identification information of the wireless terminal devices 2-1, 2-2 is written in the "terminal identification information" field. In the "address information" field is written the address information assigned to the wireless terminal devices 2-1, 2-2 of the corresponding terminal identification information. Here, address information is, for example, an IP address. In the "channel identification information" field is written the channel identification information of the channel used by the wireless terminal devices 2-1, 2-2 of the corresponding terminal device identification information. The "response request signal transmission time" field contains the fields "transmission time 1", "transmission time 2", . . . as a plurality of sub-fields. Each of "transmission time 1," "transmission time 2," . . . contains information indicating the time at which the response request signal is transmitted.

The response request signal transmission unit 153 refers to the position determination timing table 155, and when the time indicated by the clock unit 18 matches the time written in one of the "transmission time 1", "transmission time 2", . . . fields in the position determination timing table 155, reads the terminal device information and the address information respectively written in the "terminal device identification information" field and "address information" field of the matching record. The response request signal transmission unit 153 generates a response request signal that includes the terminal device identification information and address information that have been read. The response request signal transmission unit 153 transmits the generated response request signal to the connection destination AP device 3-1 to 3-3 via the wireless communication unit 17. The response request signal transmission unit 153, when transmitting the response request signal, outputs the address information contained in the response request signal to the response signal reception unit 154.

The response signal reception unit 154 determines whether a response signal corresponding to the address information received from the response request signal transmission unit 153 has been received via the wireless communication unit 17. The response signal reception unit 154, upon determining that it has not received a response signal corresponding to the address information received from the response request signal transmission unit 153, deletes the record corresponding to that address information from the position determination timing table 155.

Figure 8:
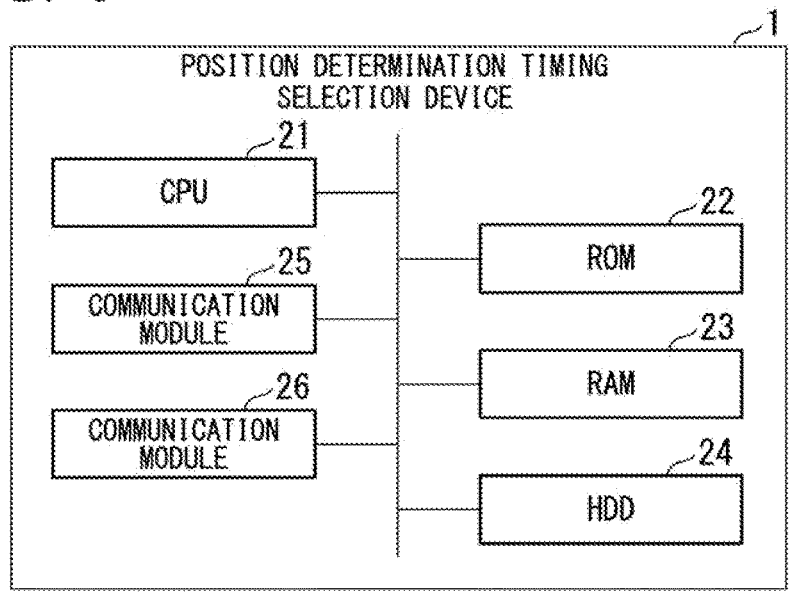
FIG. 8 is a block diagram showing a hardware configuration example of the position determination timing selection device according to the example embodiment of the present invention.

FIG. 8 is a diagram showing an example of the hardware configuration of the position determination timing selection device 1. The position determination timing selection device 1 is, for example, a computer including a CPU (Central Processing Unit) 21, ROM (Read Only Memory) 22, RAM (Random Access Memory) 23, an HDD 24, and communication modules 25 and 26. The communication module 25 is the terminal station communication unit 16. The communication module 26 is the wireless communication unit 17. The position determination timing table storage unit 152 is a storage area generated in the RAM 23 or the HDD 24. An application program stored in advance in the ROM 22 or the HDD 24 is executed by CPU 21, whereby the functional units of measurement data acquisition unit 10, the position determination timing selection unit 11, the setting information acquisition unit 12, the position determination start instruction unit 15, and the clock unit 18 are configured.
(Processing by the Position Determination Timing Selection Device)

Next, the processing by the position determination timing selection device 1 is explained with reference to FIG. 9 through FIG. 14. FIGS. 9 through 12 are flowcharts showing the flow of processing by the position determination timing selection device 1.
(Generation Process of Position Determination Timing Table)

Figure 9:
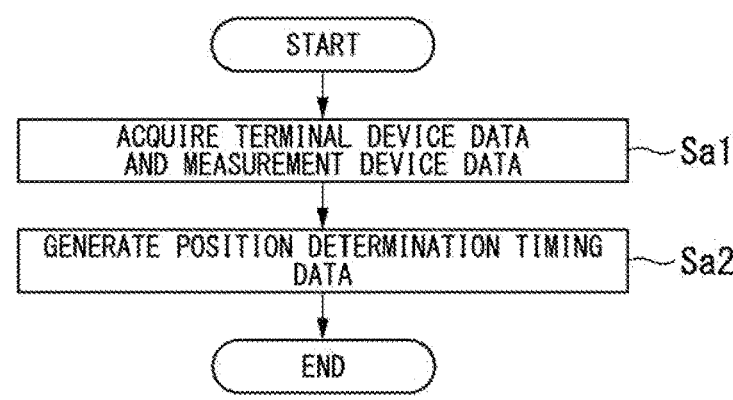
FIG. 9 is a flowchart showing the flow of processing by the terminal device data acquisition unit, the measurement device data acquisition unit, and the position determination timing table generation unit according to the example embodiment of the present invention.

FIG. 9 is a flowchart showing the flow of processing by the setting information acquisition unit 12 and the position determination timing table generation unit 151. Before the process of the flowchart shown in FIG. 9 starts, the wireless terminal devices 2-1, 2-2, the AP devices 3-1 to 3-3 and the measurement devices 4-1 to 4-4 are activated, and the wireless terminal devices 2-1, 2-2 use any one of the wireless LAN channels provided by the AP devices 3-1 to 3-3 to connect to any one of the AP devices 3-1 to 3-3. Therefore, the terminal device data table 93 and the measurement device data table 94 are generated in the memory unit 92 of the server device 9.

When the position determination timing selection device 1 is activated, the terminal device data acquisition unit 13 generates a terminal device data request signal. The terminal device data acquisition unit 13 sends the generated terminal device data request signal to the server device 9 via the terminal station communication unit 16, base station device 6, core network 7, and Internet network 8. The transmission and reception unit 91 of the server device 9, upon receiving the terminal device data request signal, reads the terminal device data stored by the terminal device data table 93 in the storage unit 92, i.e., all the records stored by the terminal device data table 93. The transmission and reception unit 91 generates a terminal device data transmission signal containing the read terminal device data. The transmission and reception unit 91 transmits the generated terminal device data transmission signal to the position determination timing selection device 1 via the Internet network 8, core network 7, and base station device 6. The terminal device data acquisition unit 13 receives the terminal device data transmission signal via the terminal station communication unit 16, and reads the terminal device data contained in the received terminal device data transmission signal. The terminal device data acquisition unit 13 outputs the read terminal device data to the position determination timing table generation unit 151.

The measurement device data acquisition unit 14 generates the measurement device data request signal. The measurement device data acquisition unit 14 transmits the generated measurement device data request signal to the server device 9 via the terminal station communication unit 16, base station device 6, core network 7, and Internet network 8. The transmission and reception unit 91 of the server device 9, upon receiving the measurement device data request signal, reads the measurement device data stored by the measurement device data table 94 in the storage unit 92, i.e., all records stored by the measurement device data table 94. The transmission and reception unit 91 generates a measurement device data transmission signal that includes the read-out measurement device data. The transmission and reception unit 91 transmits the generated measurement device data transmission signal to the position determination timing selection device 1 via the Internet network 8, core network 7, and base station device 6. The measurement device data acquisition unit 14 receives the measurement device data transmission signal via the terminal station communication unit 16 and reads the measurement device data contained in the received measurement device data transmission signal. The measurement device data acquisition unit 14 outputs the read-out measurement device data to the position determination timing table generation unit 151 (Step Sa1).

In the processing of Step Sa1, as described above, the terminal device data acquisition unit 13 may perform the processing first, and the measurement device data acquisition unit 14 may perform the processing afterwards. Alternatively, the measurement device data acquisition unit 14 may perform the processing first and the terminal device data acquisition unit 13 may perform the processing afterwards. Alternatively, the processing by the terminal device data acquisition unit 13 and the processing by the measurement device data acquisition unit 14 may be performed in parallel.

The position determination timing table generation unit 151 takes in the terminal device data output by the terminal device data acquisition unit 13 and the measurement device data output by the measurement device data acquisition unit 14. The position determination timing table generation unit 151 generates the position determination timing table 155 in the position determination timing table storage unit 152 based on the terminal device data and measurement device data that were taken in. The position determination timing table generation unit 151 generates a record for each piece of terminal device identification information included in the terminal device data in the position determination timing table 155, and writes the terminal device identification information included in the terminal device data and the channel identification information in the "terminal device identification information" and "channel identification information" fields in the generated record, respectively.

The position determination timing table generation unit 151, for example, refers to the address correspondence list data that associates the terminal device identification information and address information obtained in advance and writes the address information corresponding to the terminal device identification information of the "terminal device identification information" field in the "address information" field.

Based on the measurement period for each channel to be measured for measurement devices 4-1 to 4-4 included in the measurement device data, the position determination timing table generation unit 151 selects, for example, a plurality of transmission times for each channel from 0:00 to 24:00 corresponding to the channel identification information written in the "channel identification information" field of the position determination timing table 155. While the measurement periods of the measurement devices 4-1 to 4-4 are known from the measurement periods included in the measurement device data, the time when the measurement devices 4-1 to 4-4 actually perform measurement is unknown. Therefore, the position determination timing table generation unit 151 arbitrarily selects a plurality of transmission times, for example, by the following method.

The position determination timing table generation unit 151 randomly selects a time to be written in the "transmission time 1" field of each record from 0:00:00 to 0:00:59. The position determination timing table generation unit 151 arbitrarily selects a plurality of transmission times, between 0:00 and 24:00, to be written in each of "transmission time 2", "transmission time 3", . . . , with the time written in the "transmission time 1" field serving as a reference, so as to become the measurement period of the corresponding channel in each record. The position determination timing table generation unit 151 may select multiple transmission times at intervals shorter than the measurement period of each corresponding channel for each record in order to enable detailed detection of the times when the measurement devices 4-1 to 4-4 are actually performing measurements from the measurement data obtained by the measurements of the measurement devices 4-1 to 4-4. When selecting a plurality of transmission times, the position determination timing table generation unit 151 may perform the selection so that all the transmission times are different.

The position determination timing table generation unit 151 completes the process by writing the selected multiple transmission times to the "transmission time 1", "transmission time 2", . . . fields in chronological order, in the order of "transmission time 1", "transmission time 2", . . . in the "response request signal transmission time" field of the position determination timing table 155 (Step Sa2).

(Transmission Process of Response Request Signal)

Figure 10:
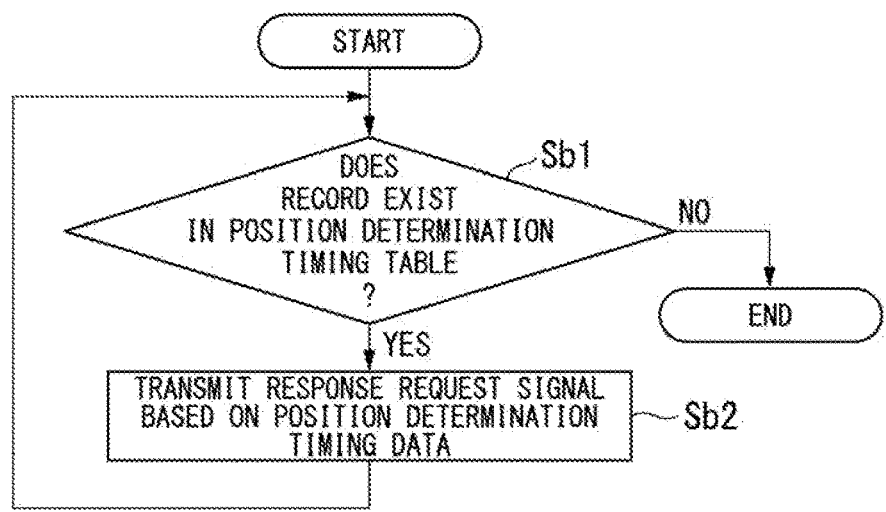
FIG. 10 is a flowchart showing the flow of processing by the response request signal transmission unit according to the example embodiment of the present invention.

FIG. 10 is a flowchart showing the process flow by the response request signal transmission unit 153. The response request signal transmission unit 153 refers to the position determination timing table 155 stored by the position determination timing table storage unit 152 to determine whether a record exists in the position determination timing table 155 (Step Sb1). If the response request signal transmission unit 153 determines that no record exists in the position determination timing table 155 (Step Sb1: No), the process ends.

On the other hand, upon determining that a record exists in the position determination timing table 155 (Step Sb1: Yes), the response request signal transmission unit 153 continues referring to the time in the clock unit 18, and when the time in the clock unit 18 corresponds to the time written in either of the items "transmission time 1," "transmission time 2", . . . in the position determination timing table 155, the response request signal transmission unit 153 reads out the terminal device identification information and address information written respectively in the "terminal device identification information" field and "address information" field of the matched record.

The response request signal transmission unit 153 generates a response request signal that includes the terminal device identification information and address information that have been read. For example, if the terminal device identification information is a MAC address and the address information is an IP address, the response request signal transmission unit 153 generates a unicast ARP (Address Resolution Protocol) request packet with the read MAC address as the destination and the IP address in the header as the response request signal. If there are multiple records whose transmission time matches the time in the clock unit 18, the response request signal transmission unit 153 generates a response request signal for each of the multiple records.

The response request signal transmission unit 153 transmits the generated response request signal to the connection destination AP devices 3-1 to 3-3 via the wireless communication unit 17. The response request signal transmission unit 153, when transmitting the response request signal, outputs the address information contained in the response request signal to the response signal reception unit 154 (Step Sb2), and then performs the process of Step Sb1 again.

(Response Signal Reception Process)

Figure 11:
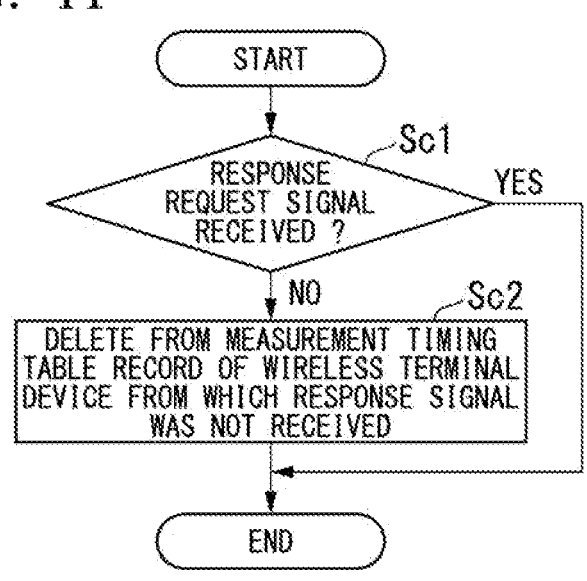
FIG. 11 is a flowchart showing the flow of processing by the response signal reception unit according to the example embodiment of the present invention.

FIG. 11 is a flowchart showing the process flow by the response signal reception unit 154. If the response request signal generated by the response request signal transmission unit 153 is a unicast ARP request packet as described above, the response request signal will reach the wireless terminal device 2-1, 2-2 corresponding to the destination MAC address of the ARP request packet. The wireless terminal device 2-1, 2-2 that received the ARP request packet generate ARP response packet including its own IP address included in the header of the ARP request packet as a response signal. The wireless terminal devices 2-1, 2-2 transmits the generated response signal to the AP device 3-1 to 3-3 to which it is connected. When transmitting this response signal, the wireless terminal device 2-1, 2-2 radiates radio waves. The measurement devices 4-1 to 4-4, whose measurement time exists during the radiation of these radio waves, can measure the radio wave strength of the radio waves radiated by the wireless terminal device 2-1, 2-2. The measurement data obtained by this measurement is stored in the measurement data table 95 stored by the storage unit 92 of the server device 9.

The response signal reception unit 154, upon taking in the address information output by the response request signal transmission unit 153, starts the processing of the flowchart shown in FIG. 11. The response signal reception unit 154 determines whether a response signal containing address information that matches the taken-in address information has been received via the wireless communication unit 17 (Step Sc1). If the response signal is the aforementioned ARP response packet, depending on whether or not the IP address contained in the ARP response packet matches the IP address received from the response request signal transmission unit 153, the response signal reception unit 154 determines whether or not a response signal containing address information that matches the address information received from the response request signal transmission unit 153 has been received.

More specifically, the decision process in Step Sc1 is performed, for example, as follows. The response signal reception unit 154 has an internal timer, and each time address information is received from the response request signal transmission unit 153, it starts a timer associated with the address information. The time measured by the timer is, for example, the time between transmitting a predetermined ARP request packet and receiving an ARP response packet. If the response signal reception unit 154 receives a response signal containing address information that matches the address information received from the response request signal transmission unit 153 before the timer expires, it judges the response signal as being received for that address information. On the other hand, if the response signal reception unit 154 does not receive a response signal containing address information that matches the address information received from the response request signal transmission unit 153 before the timer expires, it judges that a response signal was not received.

When the response signal reception unit 154 determines that it has received a response signal containing address information that matches the address information received from the response request signal transmission unit 153 (Step Sc1: Yes), it ends the process. On the other hand, if the response signal reception unit 154 determines that it did not receive a response signal containing address information that matches the address information received from the response request signal transmission unit 153 (Step Sc1: No), it deletes the record corresponding to the address information received from the response request signal transmission unit 153 from the position determination timing table 155 (Step Sc2), and ends the process.

(Position Determination Timing Selection Process)

Figure 12:
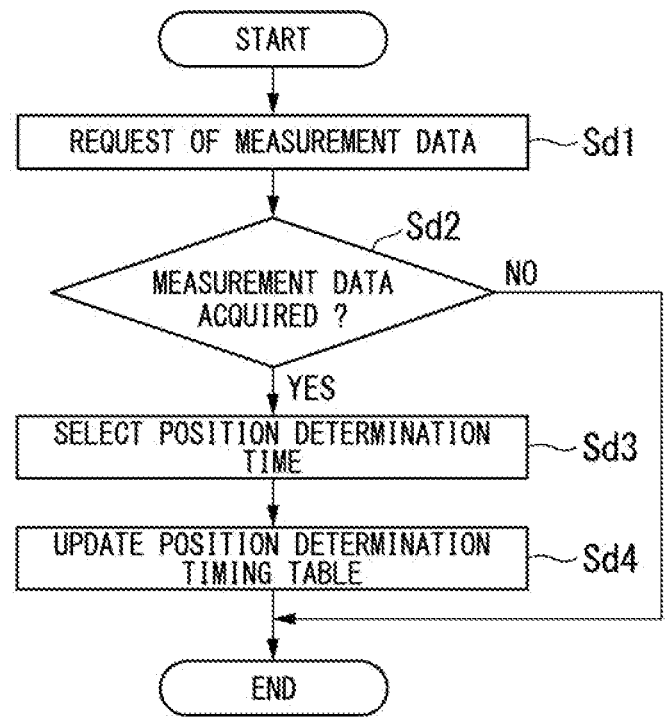
FIG. 12 is a flowchart showing the flow of processing by the measurement data acquisition unit, the position determination timing selection unit, and the position determination timing table generation unit.

FIG. 12 is a flowchart showing the flow of processing by the measurement data acquisition unit 10, the position determination timing selection unit 11, and the position determination timing table generation unit 151. When the process of the flowchart shown in FIG. 10 is performed, the measurement devices 4-1 to 4-4 can measure the radio waves radiated by the wireless terminal devices 2-1 and 2-2. This will result in the accumulation of measurement data in the measurement data table 95 stored by the storage unit 92 of the server device 9.

Periodically, the measurement data acquisition unit 10 refers to the time indicated by the clock unit 18 and arbitrarily determines the time at two points in time that are before the referenced time. The measurement data acquisition unit 10 defines the later of the two time points, i.e., the one closer to the referenced time, as the acquisition end point time and the other one as the acquisition start point time. The measurement data acquisition unit 10 generates a measurement data request signal that includes the acquisition start point time and the acquisition end point time that were defined. The measurement data acquisition unit 10 transmits the generated measurement data request signal to the server device 9 via the terminal station communication unit 16, base station device 6, core network 7, and Internet network 8 (Step Sd1).

Upon receiving the measurement data request signal, the transmission and reception unit 91 of the server unit 9 detects records in the measurement data stored in the measurement data table 95 of the storage unit 92 for which the time entered in the "measurement start time" field is a time after the acquisition start point time and the time entered in the "measurement end time" field is before the acquisition end point time. The transmission and reception unit 91 reads the detected records as measurement data to be acquired and generates a measurement data transmission signal containing the read measurement data. The transmission and reception unit 91 may read out the data written in all fields of the detected records as measurement data, or may read out the measurement device identification information, channel identification information, measurement start time, and measurement end time written in the "measurement device identification information," "channel identification information," "measurement start time," and "measurement end time" fields, respectively, as measurement data.

The transmission and reception unit 91 transmits the generated measurement data transmission signal to the position determination timing selection device 1 via the Internet network 8, core network 7, and base station device 6. The measurement data acquisition unit 10 receives the measurement data transmission signal via the terminal station communication unit 16.

The measurement data acquisition unit 10 determines whether the received measurement data transmission signal contains measurement data (Step Sd2). The measurement data acquisition unit 10, upon determining that the received measurement data transmission signal does not contain measurement data (Step Sd2: No), ends the process. On the other hand, the measurement data acquisition unit 10, upon determining that the received measurement data transmission signal contains measurement data (Step Sd2: Yes), reads the measurement data from the measurement data transmission signal. The measurement data acquisition unit 10 outputs the measurement data that was read out to the position determination timing selection unit 11.

Figure 13:
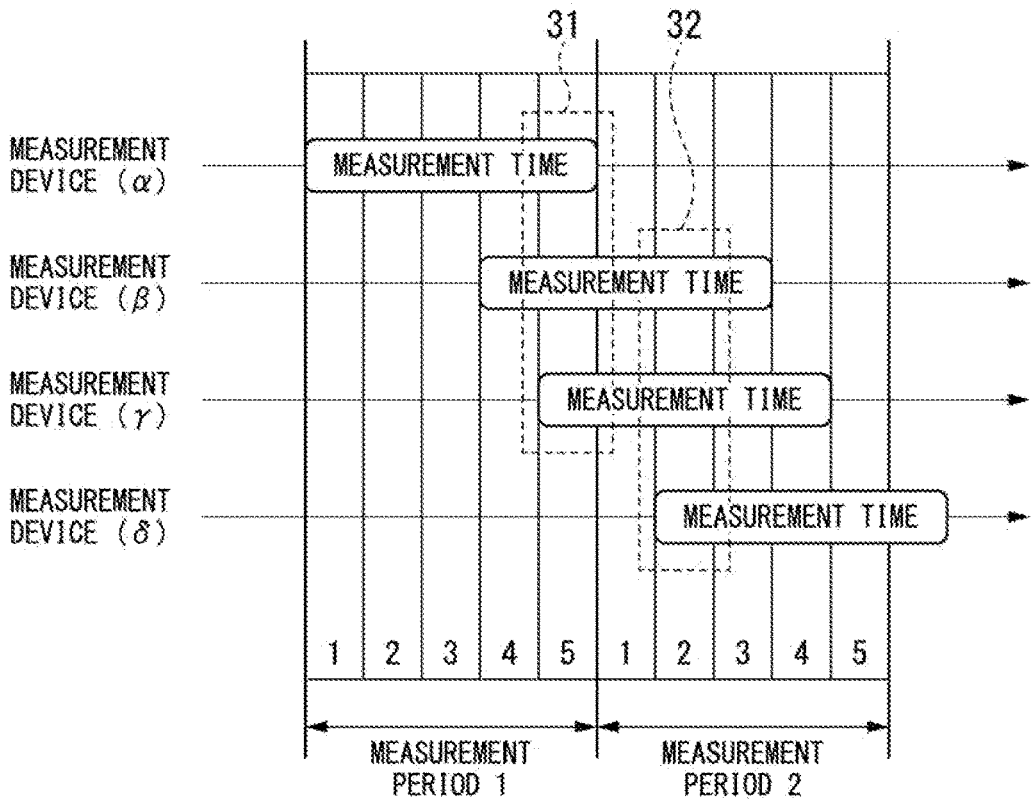
FIG. 13 is a drawing (Part 1) illustrating the process by the position determination timing selection unit according to the example embodiment of the present invention.

The position determination timing selection unit 11 takes in the measurement data output by the measurement data acquisition unit 10. The position determination timing selection unit 11 reads the measurement device identification information, channel identification information, and information indicating the measurement time, i.e., measurement start time and measurement end time, contained in the taken-in measurement data. Based on the readout measurement device identification information, channel identification information, and information indicating the measurement time, the position determination timing selection unit 11 arranges the measurement times performed by the measurement devices 4-1 to 4-4 in chronological order for each channel, as shown in FIG. 13. In FIG. 13, for example, measurement device α corresponds to measurement device 4-1, measurement device β corresponds to measurement device 4-2, measurement device γ corresponds to measurement device 4-3, and measurement device δ corresponds to measurement device 4-4.

The position determination timing selection unit 11 arbitrarily sets a time slot, which is a constant time interval, and moreover arbitrarily sets a measurement period of a certain length of time that includes multiple consecutive time slots. Here, the time slot time length is assumed to be at least long enough for the measurement devices 4-1 to 4-4 to measure the radio wave strength of radio waves. FIG. 13 shows an example of five time slots set per measurement period. The position determination timing selection unit 11 selects for each measurement period the time slot in which the number of measurement devices α to δ performing measurement reaches a maximum.

For example, in the example shown in FIG. 13, in measurement period 1 there exist the measurement times of the measurement devices α, β, and γ, and only in the fifth time slot, indicated by reference numeral 31, is the maximum number reached, so the position determination timing selection unit 11 selects the fifth time slot. In measurement period 2, there are measurement times for the measurement devices β, γ, and δ, with the time slots in which the maximum number is reached being the two time slots of the second and the third. If multiple candidate time slots exist, the position determination timing selection unit 11 selects the earliest time slot (the time slot that starts at the earliest time). Therefore, for the measurement period 2, the position determination timing selection unit 11 selects the second time slot indicated by reference numeral 32.

Figure 14:
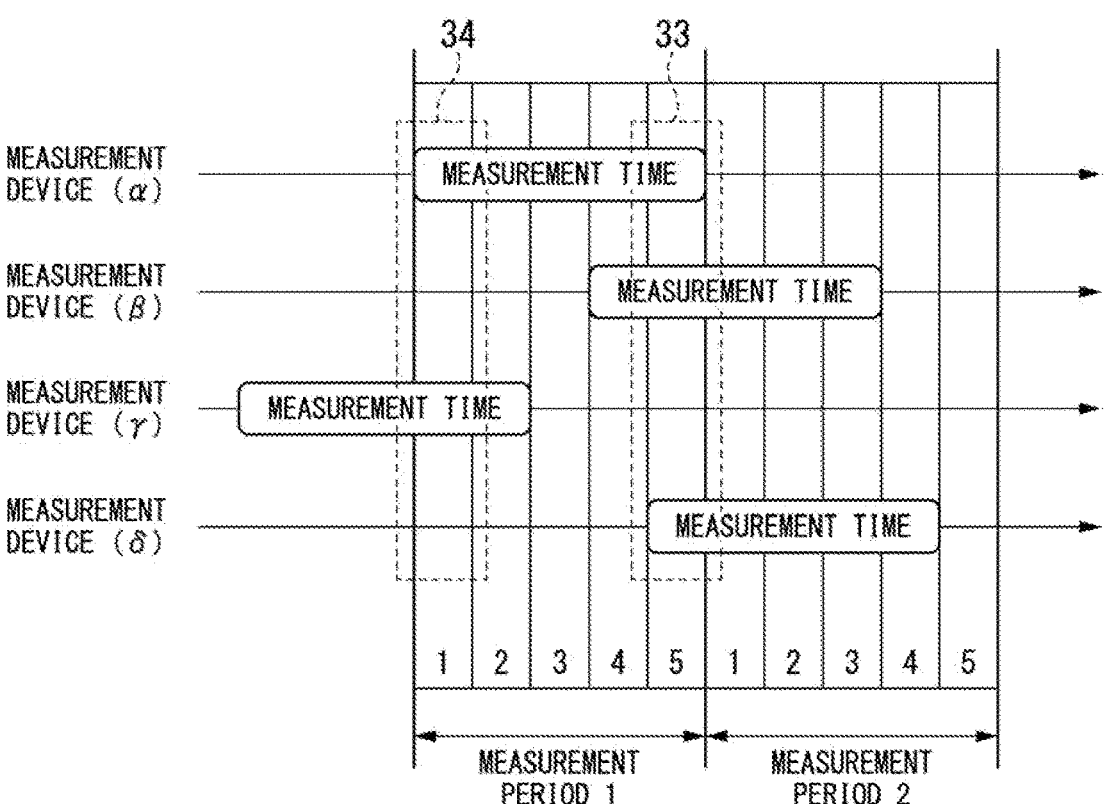
FIG. 14 is a drawing (Part 2) illustrating the process by the position determination timing selection unit according to the example embodiment of the present invention.

In the example shown in FIG. 14, the measurement times for the measurement devices α, β, γ, and δ exist in measurement period 1. The time slot in which the maximum is reached is the fifth time slot indicated by reference numeral 33, where the measurement devices α, β, and δ perform measurement. Therefore, the position determination timing selection unit 11 first selects the fifth time slot. However, the fifth time slot does not include the measurement device γ, whose measurement time exists in measurement period 1. Therefore, among the first time slot and second time slot in which the measurement time of the measurement device γ exists, the position determination timing selection unit 11 selects the earliest first time slot, indicated by the reference numeral 34.

The conditions for the selection of time slots by the position determination timing selection unit 11 described above are summarized as follows. (1) For each measurement period, the time slot with the maximum number of measurement devices α to δ whose measurement times exist in that measurement period is selected. (2) If measurement devices α to δ whose measurement times exist in the measurement period are not included in the selected time slot, the time slot including the measurement times of the measurement devices α to δ that were not included is selected. (3) If there are multiple candidate time slots in a measurement period, the earliest time slot is selected.

The position determination timing selection unit 11 defines the time between the start time and the end time of the time slot selected as described above as the position determination time. The position determination timing selection unit 11, assuming the selected position determination time to occur periodically, extends from 0:00 to 24:00, and further selects the position determination time for each measurement period (Step Sd3).

The position determination timing selection unit 11 outputs the selected position determination time in each measurement period for each channel to the position determination timing table generation unit 151. The position determination timing table generation unit 151 takes in the position determination time in each measurement period for each channel output by the position determination timing selection unit 11. The position determination timing table generation unit 151 rewrites and updates the transmission times written in the "transmission time 1", "transmission time 2", . . . fields included in the "response request signal transmission time" field of the position determination timing table 155 based on each position determination time in the measurement period for each channel taken in (Step Sd4), and then ends the process.

For example, assume the position determination timing selection unit 11 sets the time slot to "10 seconds" and sets the position determination period to "50 seconds", and the position determination timing selection unit 11 selects the position determination time between "0:00:20" and "0:00:30", between "0:00:00" and "0:00:50", which is the initial measurement period for the channel of the channel information "1". In this case, the position determination timing table generation unit 151 sets "0:00:20", which is the start time of the position determination, as the initial transmission time, and rewrites and updates the "transmission time 1" field of the record whose "channel identification information" is "1" in the position determination timing table 155 to "0:00:20".

As time passes, the number of pieces of measurement data stored by the measurement data table 95 in the storage unit 92 of the server device 9 will increase. Therefore, as the flowchart shown in FIG. 12 is repeated periodically, the accuracy of the transmission time written to the "response request signal transmission time" field in the position determination timing table 155 will increase. This means that the wireless terminal devices 2-1 and 2-2 will radiate radio waves for positioning at times when the number of measurement devices 4-1 to 4-4 performing the measurement is as large as possible and for short periods of time separated by time slots. The time length of each time slot is, as described above, at least long enough for the measurement devices 4-1 to 4-4 to measure the radio wave strength. Therefore, the transmission time per radio wave for positioning can be reduced while maintaining the resolution required for positioning. The number of samples of radio wave strength that can be measured can also be increased because the radio waves for positioning are emitted at the time when the number of measurement devices 4-1 to 4-4 that perform the measurement is as large as possible. Therefore, the wireless terminal devices 2-1 and 2-2 can improve the update frequency and accuracy of positioning by increasing the number of samples of radio wave strength while minimizing radio wave emissions and reducing battery drain.

The AP devices 3-1 to 3-3 included in the wireless communication system 100 are, for example, general wireless LAN routers, and are not APs with new functions added for positioning as in the invention described in Patent Document 2. The wireless terminal devices 2-1, 2-2 in the wireless communication system 100 are wireless terminal devices such as general smartphones, and are not, as in the invention described in Patent Document 1, wireless communication terminals with new functions for positioning added to the wireless terminal devices 2-1, 2-2. Therefore, by using the position determination timing selection device 1, it is possible to perform positioning without adding new functions for positioning to the wireless terminal devices 2-1, 2-2, and AP devices 3-1 to 3-3, while reducing battery drain of the wireless terminal devices.

In the above example embodiment, the position determination timing table generation unit 151 writes address information corresponding to the terminal device identification information in the "address information" field of the position determination timing table 155 by referring to the address correspondence list data obtained beforehand. In contrast, for example, if an address management server device storing terminal identification information and address information for each of wireless terminal devices 2-1 and 2-2 is provided in any of AP devices 3-1 to 3-3 or connected to any of the AP devices 3-1 to 3-3, the position determination timing table generation unit 151 may connect to the address management server device via the wireless communication unit 17 and acquire the terminal identification information and address information of each of the wireless terminal devices 2-1 and 2-2 from the address management server device. When the terminal identification information is a MAC address and the address information is an IP address, the position determination timing table generation unit 151 may perform a network search using the ARP protocol to obtain the terminal identification information and address information for each of the wireless terminal devices 2-1 and 2-2.

In the above example embodiment, the response request signal transmission unit 153, for example, generates unicast ARP request packets as response request signals. In contrast, the response request signal transmission unit 153 may generate ICMP (Internet Control Message Protocol) echo request packets generated by the ping command, etc. as response request signals. The wireless terminal devices 2-1 and 2-2, upon receiving an ICMP echo request packet, send an ICMP echo response packet to the source, and in doing so, they emit radio waves. The measurement devices 4-1 to 4-4, whose measurement time exists during the radiation of these radio waves, can measure the radio wave strength of the radio waves radiated by the wireless terminal devices 2-1 and 2-2. When an ICMP echo request packet serves as a response request signal, the response request signal transmission unit 153, which does not need to read the terminal device identification information from the "terminal device identification information" field in the position determination timing table 155, reads the address information, that is, the IP address, from the "address information" field, and generates the ICMP echo request packet destined for the read-out IP address as a response request signal.

The response request signal transmission unit 153 may also generate a wireless LAN frame as a response request signal. The wireless terminal devices 2-1 and 2-2, upon receiving that wireless LAN frame, transmit an Ack frame as a response signal to the AP devices 3-1 to 3-3 to which they are connected, and in doing so, they emit radio waves. The measurement devices 4-1 to 4-4, whose measurement time exists during the radiation of these radio waves, can measure the radio wave strength of the radio waves radiated by the wireless terminal devices 2-1 and 2-2. However, the Ack frame does not contain the sender's MAC address. Therefore, the measurement devices 4-1 to 4-4 must be equipped with a means to identify the wireless terminal devices 2-1 and 2-2 that are the source of the radio wave radiation corresponding to the radio wave strength to be measured when an Ack frame is transmitted. As such a means, for example, the measurement devices 4-1 to 4-4 may use a means that acquires the frame of the response request signal sent by the position determination timing selection device 1 prior to the Ack frame, and acquires the MAC address of the destination of the acquired frame. When a wireless LAN frame is used as a response request signal, the response request signal transmission unit 153 does not need to read the address information from the "address information" field in the position determination timing table 155, but reads the terminal device identification information, or MAC address, from the "terminal device identification information" field to generate the frame. Also, as mentioned above, the Ack frame does not contain the MAC address of the sender. Therefore, the response request signal transmission unit 153 outputs the frame generated instead of the address information to the response signal reception unit 154. The response signal reception unit 154 performs the judgment process in Step Sc1 shown in FIG. 11 based on whether or not the frame is an Ack frame corresponding to the frame received from the response request signal transmission unit 153.

In the above example embodiment, it is assumed that the position determination timing selection device 1 and the wireless terminal devices 2-1, 2-2 belong to the same wireless LAN subnet. However, the position determination timing selection device 1 may belong to another subnet, provided the network configuration is such connection to the wireless terminal devices 2-1 and 2-2 is possible from other subnets.

In the above example embodiment, the server device 9 is described as a cloud server, but the server device 9 may also be an on-premises server.

In the above example embodiment, the wireless terminal devices 2-1 and 2-2 of the wireless LAN protocol are used for positioning. However, wireless terminal devices of the 5G (Generation), LTE (registered trademark), LPWA (Low Power Wide Area), Bluetooth (registered trademark), and ZigBee (registered trademark) protocols may be used for positioning. The measurement devices 4-1 to 4-4 transmit the measured data via a communication means of the LTE (registered trademark) protocol. However, the measured data may be transmitted by wired and wireless LAN, LPWA, Bluetooth (registered trademark), ZigBee (registered trademark), and other protocols.

In the above example embodiment, the position determination timing selection unit 11, in Step Sd3, considering that the selected position determination time occurs periodically, extends it from 0:00 to 24:00, and further selects a position determination time for each measurement period. On the other hand, the position determination timing selection unit 11 may not consider the selected position determination time as occurring periodically, and instead output the selected position determination time for each channel in each measurement period to the position determination timing table generation unit 151 based on the measurement data acquired by the measurement data acquisition unit 10 between the acquisition start time and acquisition end time. In this case, the position determination timing table generation unit 151 will update some of the transmission times written in the "response request signal transmission time" field in the position determination timing table 155, i.e., the transmission times included between the acquisition start time and the acquisition end time.

In the above example embodiment, if the measurement device γ whose measurement time exists in the measurement period is not included in the selected time slot, the position determination timing selection unit 17 selects a time slot that includes the measurement time of the measurement device γ that was not included, as explained with reference to FIG. 14. In contrast, if the radio wave strength measured by the three measurement devices α, β, and δ allows position determination of the wireless terminal devices 2-1 and 2-2, the time slot including the measurement time of the measurement device γ, which was not included, may not be selected as a position determination time.

In the above example embodiment, the position determination timing selection unit 17 does not determine a time slot, but rather a measurement period. Under this premise, the position determination timing selection unit 17 may select the time when the number of measurement devices 4-1 to 4-4 is the maximum number in each of the defined measurement periods, arbitrarily select a portion of a predefined time length from each of the selected times, and select the selected portion as the position determination time. The predetermined time length is supposed to be, for example, a time length sufficient for at least the measurement devices 4-1 to 4-4 to measure the radio wave strength of the radio wave, similarly to a time slot.

In the above example embodiment, the position determination timing selection unit 17 does not define a measurement period, but rather defines a time slot, and for example predetermines the number of radio wave strengths required for positioning of the wireless terminal devices 2-1 and 2-2. Under this premise, the position determination timing selection unit 17 may select a time slot in which the number of measurement devices 4-1 to 4-4 is greater than or equal to the predetermined number of radio wave strengths required for positioning as the position determination time. If the time slots selected in such a manner are consecutive and the combination of the measurement devices 4-1 to 4-4 in consecutive time slots is the same, the earliest time slot among the consecutive time slots may selected as the position determination time.

In the above example embodiment, the position determination timing selection unit 17 does not specify the measurement period and the time slot, but rather, for example, predetermines the number of radio wave strengths required for positioning of the wireless terminal devices 2-1 and 2-2. Under this premise, the position determination timing selection unit 17 may select a time when the number of measurement devices 4-1 to 4-4 is equal to or greater than the predetermined number of radio wave strengths required for positioning, arbitrarily select a portion of the predetermined time length from each of the selected times, and select the selected portion as the position determination time. The predetermined time length is supposed to be, for example, a time length sufficient for at least the measurement devices 4-1 to 4-4 to measure the radio wave strength of the radio wave, similarly to a time slot.

Figure 15:
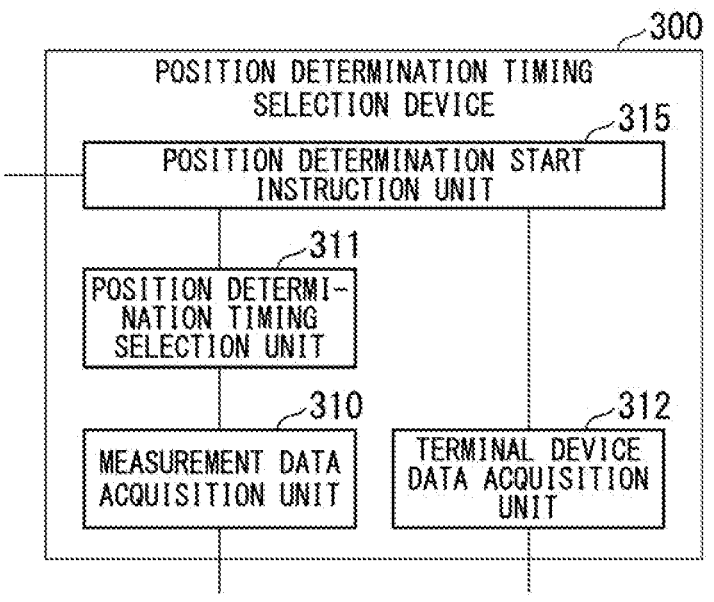
FIG. 15 is a drawing showing another configuration example of the position determination timing selection device according to the example embodiment of the present invention.

FIG. 15 is a block diagram showing the internal structure of the position determination timing selection device 300, which is used in place of the position determination timing selection device 1 according to the above example embodiment. The position determination timing selection device 300 includes a measurement data acquisition unit 310, a position determination timing selection unit 311, a terminal device data acquisition unit 312, and a position determination start instruction unit 315. The measurement data acquisition unit 310 acquires channel identification information indicating the channel measured by each of the plurality of measurement devices 4-1 to 4-4 that measure the radio wave strength of radio waves propagating in channels used by the wireless terminal devices 2-1 and 2-2 for radio wave transmission, and information indicating the measurement time at which the measurement was performed. The position determination timing selection unit 311, based on the channel identification information for each of the measurement devices 4-1 to 4-4 and the information indicating the measurement time obtained by the measurement data acquisition unit 310, selects for each channel a time that satisfies the predetermined conditions for the number of measurement devices 4-1 to 4-4 that perform the measurement, and selects the position determination time for each of the channels from each of the selected times. The terminal device data acquisition unit 312 acquires channel identification information indicating the channels used by the wireless terminal devices 2-1 and 2-2 subject to the position determination. The position determination start instruction unit 315 transmits a response request signal addressed to the wireless terminal devices 2-1 and 2-2 subject to the position determination at the position determination time selected by the position determination timing selection unit 311 for the channel of the channel identification information acquired by the terminal device data acquisition unit 312.

The aforementioned position determination timing selection device 1 and 300 each has a computer system inside. A program for realizing the functions of the measurement data acquisition unit 10 and 310, the position determination timing selection unit 11 and 311, the position determination start instruction unit 15 and 315, the terminal device data acquisition unit 13 and 312, and the measurement device data acquisition unit 14 may be recorded on a computer-readable recording medium, and by reading the program stored on a recording medium into a computer system and executing it, the processes described with reference to FIGS. 9 through 14 may be performed. The "computer system" referred to here includes hardware resources such as an OS and peripherals. The "computer system" also includes a WWW system provided with a homepage provision environment (or display environment). In addition, the "computer-readable recording medium" refers to portable media such as a flexible disk, optical magnetic disk, ROM, CD-ROM, and storage devices such as hard disks built into computer systems. Furthermore, the "computer-readable recording medium" also includes a device that temporarily retains the program, such as the internal volatile memory (RAM) in a computer system that serves as a server or client when the program is transmitted via a network such as the Internet or a communication line such as a telephone line.

The aforementioned program may be transmitted from a computer system that stores this program in a storage device or the like to another computer system via a transmission medium or by transmission waves in a transmission medium. Here, the "transmission medium" for transmitting the program refers to a medium that has the function of transmitting information, such as a network (communication network) such as the Internet or a communication circuit (communication line) such as a telephone line. The aforementioned program may also be used to realize some of the aforementioned functions. Furthermore, the above program may be a so-called differential file (differential program), which can realize the aforementioned functions in combination with a program already recorded in the computer system.

Although the example embodiments of this invention have been described in detail with reference to the drawings, specific configurations are not limited to the example embodiments, but also include designs and the like within a scope not departing from the gist of this invention.

Some or all of the above example embodiments may also be described as, but not limited to, the following supplementary notes.

(Supplementary Note 1) A position determination timing selection device comprising: a measurement data acquisition means that acquires channel identification information indicating a channel measured by each of a plurality of measurement devices that measure a radio wave strength of radio waves propagating in the channel used by a wireless terminal device for radio wave transmission, and information indicating a measurement time at which the measurement was performed; a position determination timing selection means that, for each channel, selects a time at which number of the measurement devices performing measurement satisfies a predetermined condition defined in advance based on the channel identification information of each measurement device acquired by the measurement data acquisition means and the information indicating the measurement time, and selects a position determination time for each channel from each selected time; a terminal device data acquisition means that acquires the channel identification information indicating the channel used by the wireless terminal device subject to position determination; and a position determination start instruction means that transmits a response request signal addressed to the wireless terminal device subject to the position determination at the position determination time selected by the position determination timing selection means for the channel of the channel identification information acquired by the terminal device data acquisition means.

(Supplementary Note 2) The position determination timing selection device according to supplementary note 1, wherein the position determination timing selection means arbitrarily determines a time interval of a certain length of time and a measurement period of a certain length of time including a plurality of the consecutive time intervals, sets the predetermined condition as maximum number of the measurement devices that perform measurement in each of the measurement periods, selects in each of the measurement periods a time of the time interval in which number of the measurement devices that perform measurement reaches maximum number for each channel based on the channel identification information of each measurement device acquired by the measurement data acquisition means and the measurement time, and selects each of the selected times as the position determination time of each of the measurement periods for each of the channels.

(Supplementary Note 3) The position determination timing selection device according to supplementary note 2, wherein the position determination timing selection means, when there exists the measurement device whose measurement time exists in the measurement period but is not included in the position determination time, further selects, as the position determination time, the time indicated by the time interval within the same measurement period during which the measurement device not included in the position determination time performs measurement.

(Supplementary Note 4) The position determination timing selection device according to supplementary note 2 or supplementary note 3, wherein the position determination timing selection means, when selecting the position determination time, when there are a plurality of the time intervals that are candidates for the position determination time, selects the time indicated by the earliest time interval as the position determination time.

(Supplementary Note 5) The position determination timing selection device according to supplementary note 1, wherein the position determination timing selection means arbitrarily defines a measurement period of a certain length of time, sets the predetermined condition as maximum number of the measurement devices that perform measurement in each of the measurement periods, selects in each of the measurement periods a time in which number of the measurement devices that perform measurement reaches maximum number for each channel, based on the channel identification information of each measurement device acquired by the measurement data acquisition means and the measurement time, arbitrarily selects a portion of a predetermined time length in each selected time, and selects each selected portion as the position determination time of each measurement period for each channel.

(Supplementary Note 6) The position determination timing selection device according to supplementary note 1, wherein the position determination timing selection means arbitrarily defines a time interval of a certain length of time, sets the predetermined condition as number of the radio wave strengths or greater required for position determination of the wireless terminal device determined in accordance with position determination accuracy, selects for each channel a time of the time interval in which the number of the measurement devices that perform measurement is equal to or greater than the number of radio wave strengths required for the position determination of the wireless terminal device determined in accordance with the position determination accuracy based on the channel identification information of each measurement device acquired by the measurement data acquisition means and the measurement time, and selects each of the selected times as the position determination time of each measurement period for each channel.

(Supplementary Note 7) The position determination timing selection device according to supplementary note 6, wherein the position determination timing selection means, when the selected position determination times are consecutive, and when a combination of the measurement devices in the consecutive position determination times is the same, sets only the earliest position determination time as the position determination time.

(Supplementary Note 8) The position determination timing selection device according to supplementary note 1, wherein the position determination timing selection means sets the predetermined condition as number of the radio wave strengths or greater required for position determination of the wireless terminal device determined in accordance with the position determination accuracy, selects for each channel a time in which number of the measurement devices that perform measurement is equal to or greater than the number of radio wave strengths required for the position determination of the wireless terminal device determined in accordance with the position determination accuracy based on the channel identification information of each measurement device acquired by the measurement data acquisition means and the measurement time, arbitrarily selects a portion of a predetermined time length in each of the selected times, and selects each of the selected times as the position determination time of each measurement period for each channel.

(Supplementary Note 9) The position determination timing selection device according to any one of supplementary notes 1 to 8, wherein the position determination start instruction means excludes the wireless terminal device that is the destination of the response request signal from a position determination target if no response signal corresponding to the transmitted response request signal is received.

(Supplementary Note 10) A wireless communication system comprising: a wireless terminal device; a plurality of measurement devices that measure a radio wave strength of radio waves propagating in a channel used by the wireless terminal device for radio wave transmission; and a position determination timing selection device, wherein the position determination timing selection device comprises: a measurement data acquisition means that acquires channel identification information indicating the channel measured by each of the plurality of measurement devices, and information indicating a measurement time at which the measurement was performed; a position determination timing selection means that, for each channel, selects a time at which number of the measurement devices performing measurement satisfies a predetermined condition defined in advance based on the channel identification information of each measurement device acquired by the measurement data acquisition means and the information indicating the measurement time, and selects a position determination time for each channel from each selected time; a terminal device data acquisition means that acquires the channel identification information indicating the channel used by the wireless terminal device subject to position determination; and a position determination start instruction means that transmits a response request signal addressed to the wireless terminal device subject to the position determination at the position determination time selected by the position determination timing selection means for the channel of the channel identification information acquired by the terminal device data acquisition means.

(Supplementary Note 11) A position determination timing selection method comprising: acquiring channel identification information indicating a channel measured by each of a plurality of measurement devices that measure a radio wave strength of radio waves propagating in the channel used by a wireless terminal device for radio wave transmission, and information indicating a measurement time at which the measurement was performed; selecting, for each channel, a time at which number of the measurement devices performing measurement satisfies a predetermined condition defined in advance based on the acquired channel identification information of each measurement device and the information indicating the measurement time; selecting a position determination time for each channel from each selected time; acquiring the channel identification information indicating the channel used by the wireless terminal device subject to position determination; and transmitting a response request signal addressed to the wireless terminal device subject to the position determination at the selected position determination time for the channel of the acquired channel identification information.

(Supplementary Note 12) A recording medium that stores a program for causing a computer to function as: a measurement data acquisition means that acquires channel identification information indicating a channel measured by each of a plurality of measurement devices that measure a radio wave strength of radio waves propagating in the channel used by a wireless terminal device for radio wave transmission, and information indicating a measurement time at which the measurement was performed; a position determination timing selection means that, for each channel, selects a time at which number of the measurement devices performing measurement satisfies a predetermined condition defined in advance based on the channel identification information of each measurement device acquired by the measurement data acquisition means and the information indicating the measurement time, and selects a position determination time for each channel from each selected time; a terminal device data acquisition means that acquires the channel identification information indicating the channel used by the wireless terminal device subject to position determination; and a position determination start instruction means that transmits a response request signal addressed to the wireless terminal device subject to the position determination at the position determination time selected by the position determination timing selection means for the channel of the channel identification information acquired by the terminal device data acquisition means.

Priority is claimed on Japanese Patent Application No. 2021-042605, filed Mar. 16, 2021, the content of which is incorporated herein by reference.

INDUSTRIAL APPLICABILITY

The present invention can be used in wireless communication systems that measure the position of wireless terminal devices.

DESCRIPTION OF REFERENCE SYMBOLS

1 Position determination timing selection device
10 Measurement data acquisition unit (measurement data acquisition means)
11 Position determination timing selection unit (position determination timing selection means)
12 Setting information acquisition unit
13 Terminal device data acquisition unit (terminal device data acquisition means)
14 Measurement device data acquisition unit
15 Position determination start instruction unit (position determination start instruction means)
151 Position determination timing table generation unit
152 Position determination timing table storage unit
153 Response request signal transmission unit
154 Response signal reception unit
16 Terminal station communication unit
17 Wireless communication unit
18 Clock unit

What is claimed is:

1. A position determination timing selection device comprising:
   a memory configured to store instructions; and
   a processor configured to execute the instructions to:
     acquire channel identification information indicating a channel measured by each of a plurality of measurement devices that measure a radio wave strength of radio waves propagating in the channel used by a wireless terminal device for radio wave transmission, and information indicating a measurement time at which the measurement was performed;
     for each channel, select a time at which number of the measurement devices performing measurement satisfies a predetermined condition defined in advance based on the acquired channel identification information of each measurement device and the information indicating the measurement time, and select a position determination time for each channel from each selected time;
     acquire the channel identification information indicating the channel used by the wireless terminal device subject to position determination; and
     transmit a response request signal addressed to the wireless terminal device subject to the position determination at the selected position determination time for the channel of the acquired channel identification information.

2. The position determination timing selection device according to claim 1, wherein the processor is configured to execute the instructions to arbitrarily determine a measurement period of a certain length of time including a plurality of consecutive time intervals each of which has a certain length of time, set the predetermined condition as maximum number of the measurement devices that perform measurement in each of measurement periods including the measurement period, select in each of the measurement periods a time of the time interval in which number of the measurement devices that perform measurement reaches maximum number for each channel based on the acquired channel identification information of each measurement device and the measurement time, and select each of the selected times as the position determination time of each of the measurement periods for each of the channels.

3. The position determination timing selection device according to claim 2, wherein the processor is configured to execute the instructions to, when there exists the measurement device whose measurement time exists in the measurement period but is not included in the position determination time, further select, as the position determination time, the time indicated by the time interval within the same measurement period during which the measurement device not included in the position determination time performs measurement.

4. The position determination timing selection device according to claim 2, wherein the processor is configured to execute the instructions to, when selecting the position determination time, when there are a plurality of the time intervals that are candidates for the position determination time, select the time indicated by the earliest time interval as the position determination time.

5. The position determination timing selection device according to claim 1, wherein the processor is configured to execute the instructions to arbitrarily define a measurement period of a certain length of time, set the predetermined condition as maximum number of the measurement devices that perform measurement in each of the measurement periods, select in each of the measurement periods a time in which number of the measurement devices that perform measurement reaches maximum number for each channel, based on the acquired channel identification information of each measurement device and the measurement time, arbitrarily select a portion of a predetermined time length in each selected time, and select each selected portion as the position determination time of each measurement period for each channel.

6. The position determination timing selection device according to claim 1, wherein the processor is configured to execute the instructions to arbitrarily define a time interval of a certain length of time, set the predetermined condition as number of the radio wave strengths required for position determination of the wireless terminal device determined in accordance with position determination accuracy or number of the radio wave strengths that is greater than the number of the radio wave strengths required for the position determination of the wireless terminal device, select for each channel a time of the time interval in which the number of the measurement devices that perform measurement is equal to or greater than the number of radio wave strengths required for the position determination of the wireless terminal device determined in accordance with the position determination accuracy based on the acquired channel identification information of each measurement device and the measurement time, and select each of the selected times as the position determination time of each measurement period for each channel.

7. The position determination timing selection device according to claim 6, wherein the processor is configured to execute the instructions to, when the selected position determination times are consecutive, and when a combination of the measurement devices in the consecutive position determination times is the same, set only the earliest position determination time as the position determination time.

8. The position determination timing selection device according to claim 1, wherein the processor is configured to execute the instructions to set the predetermined condition as number of the radio wave strengths required for position determination of the wireless terminal device determined in accordance with a position determination accuracy or number of the radio wave strengths that is greater than the number of the radio wave strengths required for the position determination of the wireless terminal device, select for each channel a time in which number of the measurement devices that perform measurement is equal to or greater than the number of radio wave strengths required for the position determination of the wireless terminal device determined in accordance with the position determination accuracy based on the acquired channel identification information of each measurement device and the measurement time, arbitrarily select a portion of a predetermined time length in each of the selected times, and select each of the selected times as the position determination time of each measurement period for each channel.

9. The position determination timing selection device according to claim 1, wherein the processor is configured to execute the instructions to exclude the wireless terminal device that is the destination of the response request signal from a position determination target if no response signal corresponding to the transmitted response request signal is received.

10. A wireless communication system comprising:
a wireless terminal device;
a plurality of measurement devices that measure a radio wave strength of radio waves propagating in a channel used by the wireless terminal device for radio wave transmission; and
a position determination timing selection device,
wherein the position determination timing selection device comprises:
a memory configured to store instructions; and
a processor configured to execute the instructions to:
acquire channel identification information indicating the channel measured by each of the plurality of measurement devices, and information indicating a measurement time at which the measurement was performed;
for each channel, select a time at which number of the measurement devices performing measurement satisfies a predetermined condition defined in advance based on the acquired channel identification information of each measurement device and the information indicating the measurement time, and select a position determination time for each channel from each selected time;
acquire the channel identification information indicating the channel used by the wireless terminal device subject to position determination; and
transmit a response request signal addressed to the wireless terminal device subject to the position determination at the selected position determination time for the channel of the acquired channel identification information.

11. A position determination timing selection method comprising:
acquiring channel identification information indicating a channel measured by each of a plurality of measurement devices that measure a radio wave strength of radio waves propagating in the channel used by a wireless terminal device for radio wave transmission, and information indicating a measurement time at which the measurement was performed;

selecting, for each channel, a time at which number of the measurement devices performing measurement satisfies a predetermined condition defined in advance based on the acquired channel identification information of each measurement device and the information indicating the measurement time;

selecting a position determination time for each channel from each selected time;

acquiring the channel identification information indicating the channel used by the wireless terminal device subject to position determination; and transmitting a response request signal addressed to the wireless terminal device subject to the position determination at the selected position determination time for the channel of the acquired channel identification information.

* * * * *